United States Patent
Thompson et al.

(10) Patent No.: US 9,170,852 B2
(45) Date of Patent: Oct. 27, 2015

(54) SELF-UPDATING FUNCTIONALITY IN A DISTRIBUTED SYSTEM

(75) Inventors: Daniel J Thompson, Duvall, WA (US); Ali Ediz Turkoglu, Sammamish, WA (US); Gaurav Omprakash Deshpande, Redmond, WA (US); Mallikarjun Chadalapaka, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 13/364,714

(22) Filed: Feb. 2, 2012

(65) Prior Publication Data

US 2013/0205128 A1    Aug. 8, 2013

(51) Int. Cl.
*G06F 15/177*    (2006.01)
*G06F 9/50*    (2006.01)
*H04L 12/24*    (2006.01)

(52) U.S. Cl.
CPC .......... *G06F 9/5088* (2013.01); *H04L 41/0813* (2013.01)

(58) Field of Classification Search
CPC ........................................ H04L 41/08–41/0889
USPC .......................................... 709/205, 220–224
See application file for complete search history.

(56) References Cited

U.S. PATENT DOCUMENTS

| | | |
|---|---|---|
| 7,000,046 B1 | 2/2006 | Cooper et al. |
| 7,000,230 B1 | 2/2006 | Murray et al. |
| 7,043,580 B1 | 5/2006 | Heideman et al. |
| 7,043,732 B2 | 5/2006 | Mandal et al. |
| 7,149,923 B1 | 12/2006 | Heideman et al. |
| 7,155,638 B1 | 12/2006 | Heideman et al. |
| 7,178,057 B1 | 2/2007 | Heideman et al. |
| 7,181,642 B1 | 2/2007 | Heideman et al. |
| 7,424,717 B2 | 9/2008 | Blevins |
| 7,464,378 B1 * | 12/2008 | Limaye et al. ................ 718/100 |
| 7,484,048 B2 | 1/2009 | Whitehouse |
| 7,523,461 B2 | 4/2009 | Ghanaie-Sichanie et al. |
| 7,571,227 B1 | 8/2009 | Pabla |
| 7,890,646 B2 | 2/2011 | Khosravy et al. |

(Continued)

FOREIGN PATENT DOCUMENTS

| | | |
|---|---|---|
| JP | 09114722 A | 5/1997 |
| KR | 1019930010739 A | 6/1993 |

OTHER PUBLICATIONS

Christensen, et al., "Designing Systems for Continuous Availability—Multi-Node with Block Storage", Retrieved on: Dec. 26, 2011.

(Continued)

*Primary Examiner* — Brendan Higa
(74) *Attorney, Agent, or Firm* — Henry Gabryjelski; Kate Drakos; Micky Minhas

(57) ABSTRACT

Described is a technology by which a distributed system of computer nodes that provides services is self-updated via a component of the distributed system. Such a self-updating run applies one or more updates to each of the member computer nodes in the distributed system while maintaining the services provided by the distributed system. The updating run may include moving workloads from each computer node to be updated, updating that node, and reinstating workloads after updating. Performing the updating run may include moving update-related responsibility, which may be a workload, from one computer node to another computer node.

20 Claims, 10 Drawing Sheets

(56) References Cited

U.S. PATENT DOCUMENTS

| | | | |
|---|---|---|---|
| 8,103,643 | B2 | 1/2012 | Danilov et al. |
| 8,301,589 | B2 | 10/2012 | Sen et al. |
| 8,560,662 | B2 | 10/2013 | Chadalapaka et al. |
| 2002/0091819 | A1 | 7/2002 | Melchione et al. |
| 2003/0079155 | A1 | 4/2003 | Kingsbury |
| 2004/0003007 | A1 | 1/2004 | Prall et al. |
| 2004/0148184 | A1 | 7/2004 | Sadiq |
| 2004/0205401 | A1* | 10/2004 | Froehlich et al. ............... 714/28 |
| 2005/0086384 | A1 | 4/2005 | Ernst |
| 2006/0015861 | A1 | 1/2006 | Takata et al. |
| 2006/0248127 | A1 | 11/2006 | Whitehouse |
| 2006/0294413 | A1* | 12/2006 | Filz et al. ......................... 714/4 |
| 2007/0220242 | A1 | 9/2007 | Suzuki et al. |
| 2007/0220510 | A1 | 9/2007 | Bell et al. |
| 2009/0240791 | A1* | 9/2009 | Sakurai et al. ................ 709/221 |
| 2009/0300619 | A1 | 12/2009 | Hicks et al. |
| 2010/0257149 | A1 | 10/2010 | Cognigni et al. |
| 2011/0153797 | A1 | 6/2011 | Danilov et al. |
| 2012/0124193 | A1* | 5/2012 | Ebrahim et al. .............. 709/224 |
| 2012/0239739 | A1 | 9/2012 | Manglik et al. |
| 2013/0067454 | A1 | 3/2013 | Thompson et al. |

OTHER PUBLICATIONS

"Cluster Aware Updating Plug-in Sample", Retrieved on: Dec. 26, 2011, Available at: http://code.msdn.microsoft.com/windowsdesktop/Cluster-Aware-Updating-6a8854c9.

Vogels, et al., "The Design and Architecture of the Microsoft Cluster Service", In Proceedings of Twenty-Eighth Annual International Symposium on Fault-Tolerant Computing, Digest of Papers, Jun. 23-25, 1998, pp. 422-431.

Kamal, et al., "A design framework of Orchestrator for computing systems", In Proceedings of International Conference on Computer Information Systems and Industrial Management Applications, Oct. 8-10, 2010, pp. 410-413.

"Platform VM Orchestrator™ v3", Retrieved on: Dec. 26, 2011, Available at: https://www.citrix.com/site/resources/dynamic/CRpartnerVMOv3_forXenServerUsers_Overview_3.pdf.

"Progel IT", Retrieved on: Dec. 26, 2011, Available at: http://www.microsoft.com/casestudies/Case_Study_Detail.aspx?CaseStudyID=4000011496.

PCT/US2013/023524, International Search Report and Written Opinion, Koreon Intellectual Property Office, 189 Cheongsa-ro, Seo-gu, Daejeon Metropolitan City, 302-70, Republic of Korea, Authorized Officer—Hong, Kyoung Ah, May 30, 2013, 9 pages.

Chatley, et al., "Modelling a Framework for Plugins", In ESEC/FSE 2003 9th European Software Engineering Conference and 11th ACM SIGSOFT Symposium on the Foundations of Software Engineering Helsinki, Finland, Sep. 1-5, 2003, pp. 49-57.

Foster, et al, "Model Checking Service Compositions under Resource Constraints", In Proceedings of the 6th Joint Meeting of the European Software Engineering Conference, ESEC-FSE '07, Sep. 3-7, 2007, Cavtat near Dubrovnik, Croatia, 10 pages.

Wang, Xiaobo, "Collaboration Instance Synchronization and Management in P2P Network", Retrieved at <<http://daim.idi.ntnu.no/masteroppgaver/IME/IDI/2008/4090/masteroppgave.pdf>>, 2008, pp. 108.

"SLD Content Synchronization", Retrieved at <<http://help.sap.com/saphelp_nwpi71/helpdata/en/46/2f42f114bc59bde10000000a155369/content.htm>>, Retrieved Date: Aug. 5, 2011, pp. 3.

"CIM Repository Synchronization for Cloud Computing", Retrieved at <<http://www.alphaworks.ibm.com/tech/cimrepository>>, Jul. 21, 2009, pp. 2.

Vambenepe, et al., "Dealing with Scale and Adaptation of Global Web Services Management", Retrieved at <<http://www.hpl.hp.com/personal/Vanish_Talwar/papers/icws05-mgmt.pdf>>, Proceedings of the IEEE International Conference on Web Services, Jul. 11-15, 2005, pp. 339-346.

* cited by examiner

SELF-UPDATING FUNCTIONALITY IN A DISTRIBUTED SYSTEM

BACKGROUND

Distributed systems provide various computer services (including applications) to clients via a collection of nodes/servers, such as arranged as clusters. When computer software is deployed in production on distributed systems, it is difficult for enterprises and the like to keep the software up-to-date with the latest fixes and software improvements without disrupting the services offered by the distributed systems. As a result, to update distributed systems, administrators perform relatively elaborate planning aimed at updating software inventory on the nodes/servers in the distributed system collection without impacting the services offered by the collection, which is sometimes referred to as "being service-aware" with respect to updates.

Typical administrator steps include migrating/re-hosting of the services from and to each server/node in such a distributed system collection so that a node can be updated while ensuring, for example, that the fault-tolerant "critical mass" (e.g., a cluster quorum) for the overall collection holds through the updating process, and using node-centric updating software to update each node. Some administrators perform these tasks manually, while others use ad-hoc scripts to attempt to automate portions of the process. In some cases there may be an end-to-end tool for a specific type of clustered service coupled with a specific type of software update management software. In any event, such information technology (IT) processes are laborious, error-prone, require IT specialists to administer, and are expensive to maintain on an ongoing basis.

As the number of distributed systems grows, operational cost of these manual processes/scripts and the IT administrators who will need to run/maintain them becomes a significant operating expense burden for IT organizations. This is especially true for small and medium-sized businesses, and organizations that tend to have a number of branch offices without local IT experts available.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a distributed system of computer nodes, which provides services, is self-updated via a component of the distributed system. The membership of computer nodes is determined, and the component performs an updating run that applies one or more updates to each of the plurality of computer nodes in the membership while maintaining the services provided by the distributed system. Performing the updating run may include rebooting and/or restarting each of the plurality of computer nodes in the membership, potentially multiple times.

In one aspect, performing the updating run comprises moving any workloads from each computer node to be updated, and reinstating least one workload on that computer node after completing the updating of that computer node. Performing the updating run may include moving orchestrator responsibility from one computer node to another computer node. Update-related state information may be persisted before moving the orchestrator responsibility from the one computer node to the other computer node, and read at the second node after moving the orchestrator responsibility from the one computer node to the other computer node.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1A:
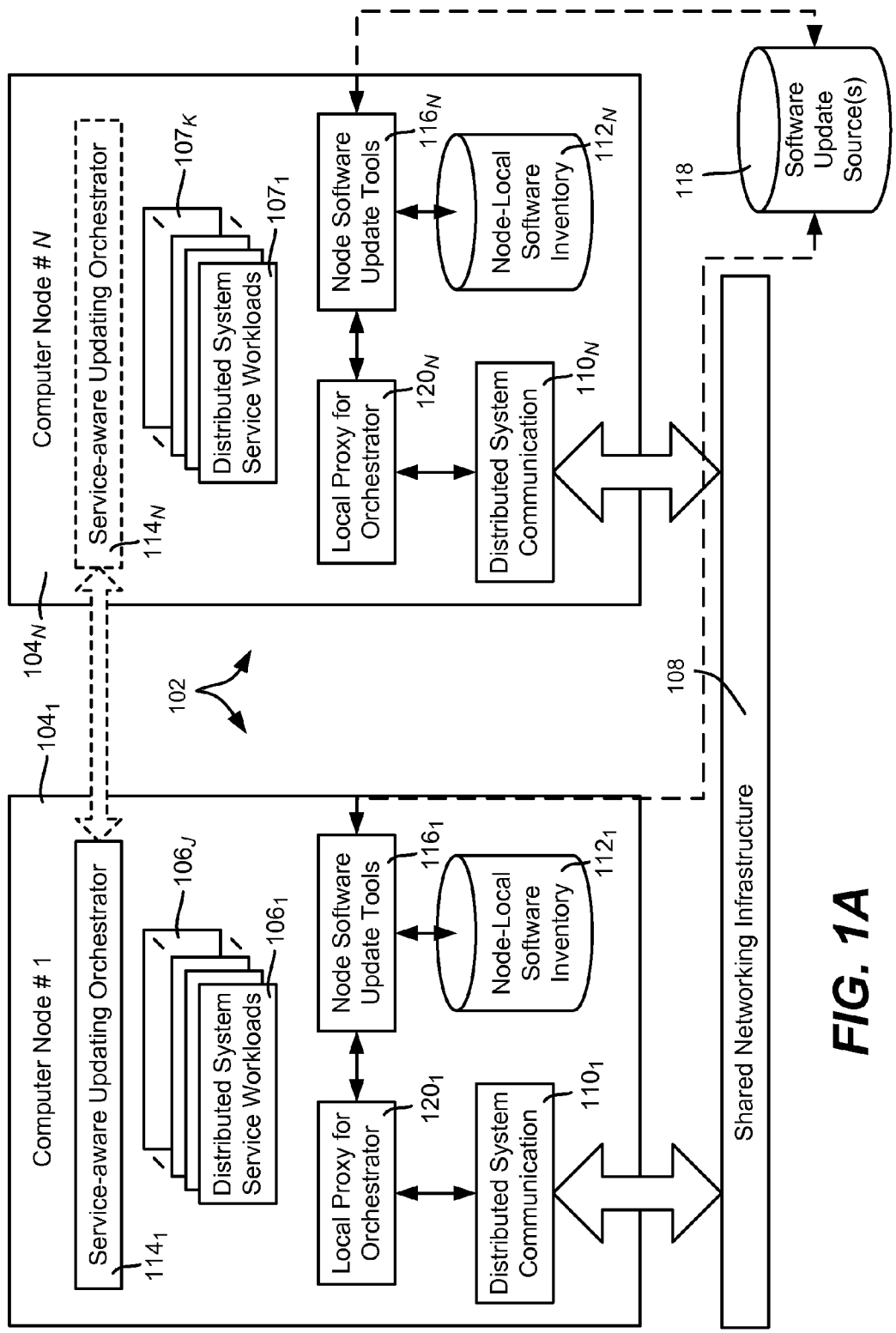
FIG. 1A is a block diagram showing example components of a distributed system that performs self-updating via a software component of the distributed system.

Various aspects of the technology described herein are generally directed towards allowing a distributed system to self-update its nodes to the current desired software levels in a service-aware fashion. In general, this provides an end-to-end distributed system updating solution that does not demand a local IT expert presence to update the distributed system software.

As will be understood, the self-updating distributed system may operate without the need of external help or monitoring. The individual computer nodes in the distributed system may continue to be governed by the update (patch) applicability rules and policies as applicable to the IT organization, at the same time being intelligent enough to self-update themselves while taking into account the global service availability considerations of the distributed system as a whole.

While various examples of distributed systems, such as a failover cluster are used herein, it should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and distributed systems in general.

In general and as described herein, self-updating cluster software (e.g., a process/thread) runs on an owner node, determines membership of the distributed system and updates each of the members; (note that before or as part of allowing non-members, such as new, disconnected or non-functioning machines, to become members of the distributed system, updating may be performed on those non-members). To this end, the self-updating cluster software may update each other node except itself, and also may operate to update the node on which it is running. In one scenario, the self-updating cluster software is "moved" from the owner node to a new owner node, which then runs an instance of the self-updating cluster software to update the previous owner node, including performing any needed reboots of that node. State information related to the update may be persisted and communicated to the new owner node via a "shared storage device". Note that in certain embodiments of "shared-nothing" distributed systems, a shared storage device may be replaced with a distributed storage service wherein the service is accessible from the nodes in the distributed system as a persistent store, even while not requiring true shared storage connectivity to all the nodes. Further, note that in an alternative scenario, the self-updating cluster software need not run on another node to install the updates onto its own node. For example, if a reboot is not needed, the self-updating cluster software only needs to install the updates. Alternatively, if a reboot is needed and the owner node is able to move its workloads to other nodes that are able to continue the distributed system's services, the self-updating software of the owner node may reboot itself to complete the updates; the owner node may write to any accessible persistent storage to persist state information across one or more reboots.

FIG. 1A shows a block diagram comprising one example implementation of a self-updating distributed system 102 comprising a plurality of computer nodes 104$_1$-104$_N$. A computer node may be a virtual machine or a physical machine, for example. A distributed system may have as few as two nodes up to any number of nodes that is practical. Indeed, the self-updating technology described herein is beneficial with as small as a two-blade server cluster, in that among other benefits, a small self-updating server cluster may be configured as an appliance-type device that needs little or no manual maintenance.

Each of the nodes contains one or more respective workloads (shown as 106$_1$-106$_J$ and 107$_1$-107$_K$) comprising services (possibly including applications) that may be distributed among the nodes of the system 102. One example of such a distributed system is a failover cluster, in which the workloads of one node in effect automatically "move" ("fail over") to one or more other nodes in the event that the one node fails or is paused, which may result from an unpredicted (e.g., crash-related) or intentional (e.g., maintenance-related) event. To this end, upon a need to move workloads from one node, instances of corresponding workloads are launched on the other node or nodes and thereby continue operating transparently to node clients. Other types of distributed systems move workloads for other reasons, such as to perform automatic load balancing or as part of manual maintenance. A shared networking infrastructure 108 coupled to distributed system communication mechanisms 110$_1$-110$_N$ facilitate the communication needed for such movement of workloads.

In general, the nodes of a distributed system need to be updated from time to time with updates to the nodes' respective node-local software inventory 112$_1$-112$_N$. Many of these updates involve rebooting the node and/or stopping the node's services, and administrators heretofore planned for such updates.

As described herein, the distributed system 102 is configured to be self-updating by adding self-updating-related software to the distributed system 102 as part of its software. For example, a .dll file directed towards a self-updating workload may be installed as part of each node's node-local software inventory 112$_1$-112$_N$. As will be understood, the self-updating-related software, when running as the local proxy for orchestrator 120, applies one or more updates to each of the plurality of computer nodes in the membership while maintaining the services provided by the distributed system.

Figure 1B:
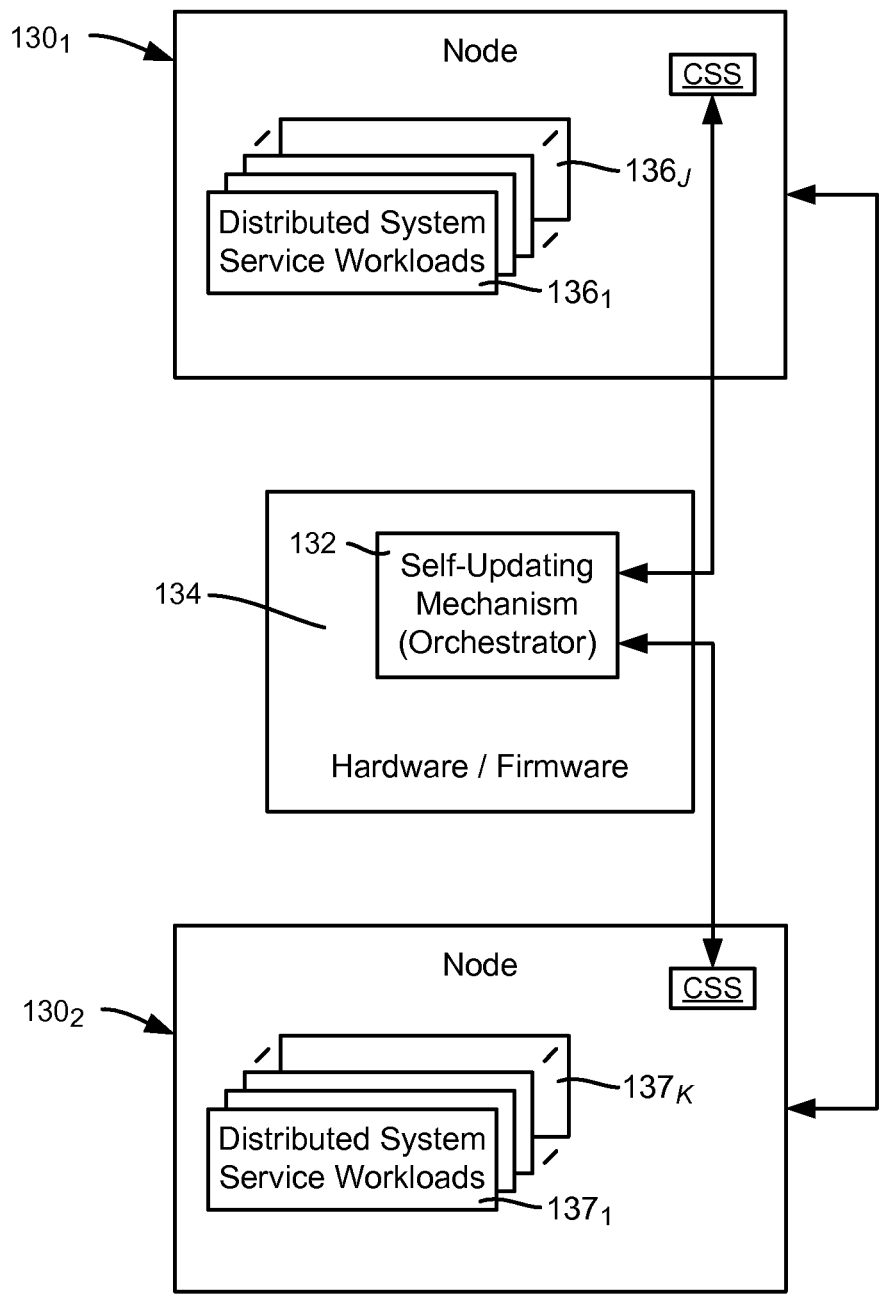
FIG. 1B is a block diagram showing example components of an alternative distributed system that performs self-updating via hardware/firmware of the distributed system.

In an alternative implementation represented in the distributed system of nodes 130$_1$ and 130$_2$ of FIG. 1B, updating may be based upon using a dedicated self-updating mechanism 132 that instantiates and coordinates the updating run, via an interface that couples the nodes 130$_1$ and 130$_2$ to an embedded hardware and/or firmware component 134 permanently coupled to each node (where "permanently" is intended to mean not intended to be easily decoupled, unlike a remote computer). Although only two nodes 130$_1$ and 130$_2$ are shown in the example of FIG. 1B, it is understood that such an implementation may include any practical number of nodes. Further, note that the distributed system of FIG. 1B, may be conveniently incorporated into an appliance-type device, (as may the implementation exemplified in FIG. 1A).

In general, the self-updating-related software initiates an "updating run," comprising one self-updating cycle through the distributed system, which in one implementation sequentially (or otherwise, such as in small groups of a large distributed system) updates each one of the distributed system nodes in a controlled manner. In one implementation, the self-update-related software comprises a workload. Among other benefits, this makes the update-related software highly available across the distributed system, including being resilient to computer node failures within the distributed system 102.

In one implementation, the part of the software (e.g., process/thread) that instantiates and coordinates the updating run is referred to as a service-aware updating orchestrator, or simply "orchestrator." The orchestrator sequentially (or otherwise, such as in small groups of a large distributed system) updates each of the distributed system nodes in a controlled manner. In the self-updating mode described herein, the orchestrator may be run on a distributed system node that is also to be updated during the current updating run, which may occur by moving the orchestrator to another node before updating the node on which the orchestrator was previously running.

As represented in FIG. 1A, a service-aware updating orchestrator 114$_1$-114$_N$ (e.g., comprising one or more processes and/or one or more threads) orchestrates the end-to-end operation of updating the distributed system 102. In general, only one instance of an orchestrator (e.g., 114$_1$) runs at a time in the distributed system, and may move across computer nodes (as indicated by the dashed arrow to dashed block 114$_N$) within the distributed system as needed during the course of the updating run.

In the example implementation of FIG. 1A, each node contains one or more node software update tools 116$_1$-116$_N$, which automatically download updates from one or more appropriate software update sources 118. A variety of different sources for the software updates may be supported, e.g., from an enterprise-local distribution point, from the public Internet (e.g. Microsoft® Update), from public cloud (e.g. Windows Azure™), from a private cloud (e.g. Windows Azure Private Appliance), and/or the like.

In the example represented in FIG. 1A, a local orchestrator proxy (e.g., a Windows® Management Instrumentation, or WMI-based component) is installed on each distributed system node, as represented by proxies 120$_1$-120$_N$. Each proxy facilitates the orchestrator-to-node interactions and provides distributed state management, during and after an updating run. The proxies 120$_1$-120$_N$ also interact with their corresponding node-local software updating tools 116$_1$-116$_N$ to effect software updates to their corresponding software inventory $112_1$-$112_N$ that is local to the computer node.

Figure 2:
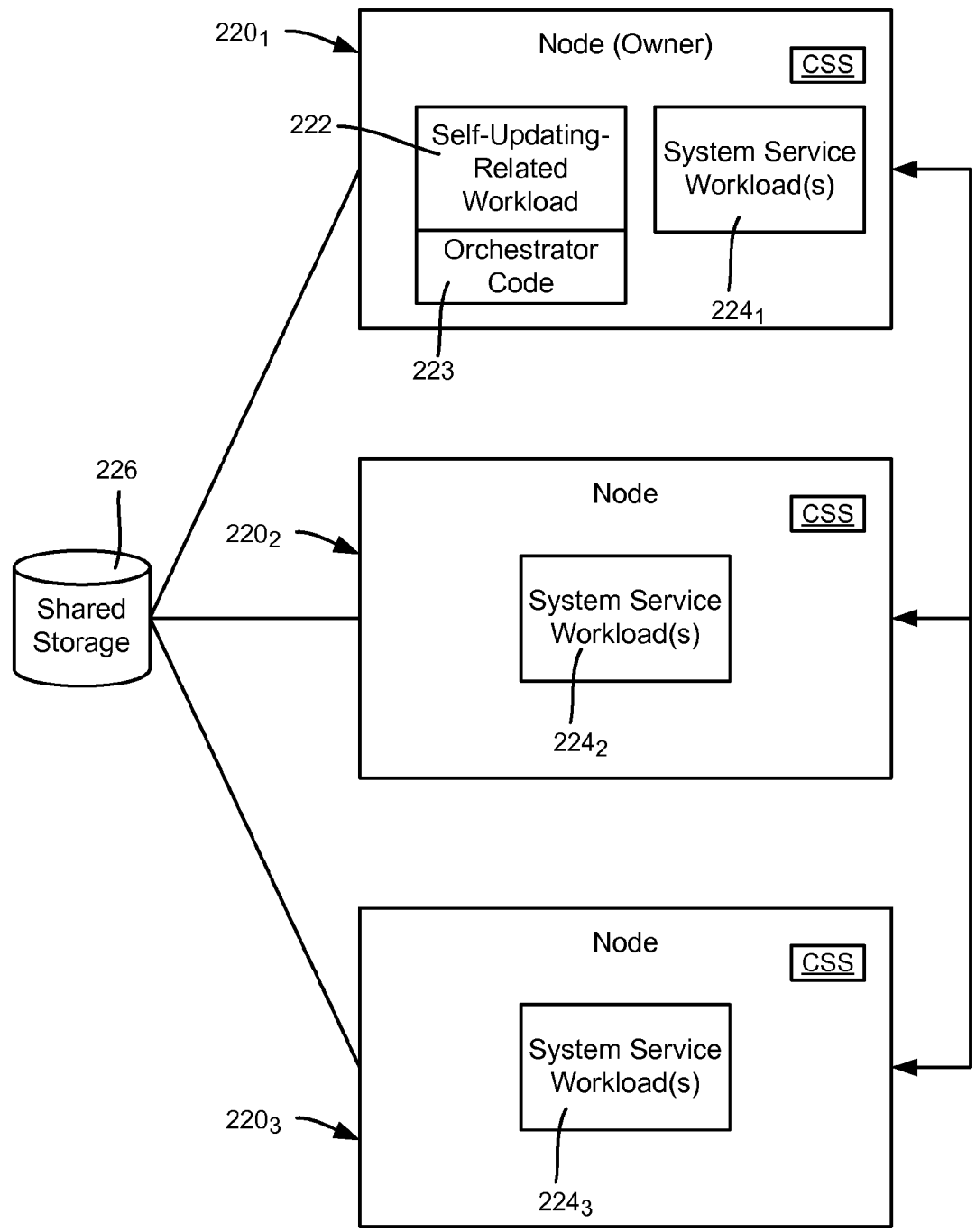
FIGS. 2-6 comprise block diagrams showing example representations of computer nodes and components of an example self-updating distributed system at various states during a self-updating run.

FIGS. 2-6 show an example over various example states of how self-updating may be performed for an example three-node (represented by nodes $220_1$-$220_3$) distributed system. As represented in FIG. 2, one of the nodes is an owner node $220_1$ with respect to running an instance of a self-updating-related workload 222. The self-updating-related workload 222 may be launched by a scheduler component, by manual interaction via a suitable interface, and/or in response to another event, such as automatically after a reboot.

In one implementation, the self-updating-related workload 222 may contain the orchestrator code 223 that operates to perform the updates. In an alternative implementation, the self-updating-related workload 222 may operate to launch a local instance of the orchestrator code 223 (e.g., as maintained in the node's node-local software inventory) that operates to perform the updates. In any event, in this example the workload/orchestrator code 222 and 223 are able to be moved across the nodes $220_1$-$220_3$ during the course of an updating run as described herein.

Each computer node $220_1$-$220_3$ hosts a number of distributed system service workloads $224_1$-$224_3$. In general, the services provided by these workloads $224_1$-$224_3$ need to remain available while the distributed system is updated with the desired software updates.

Figure 3:
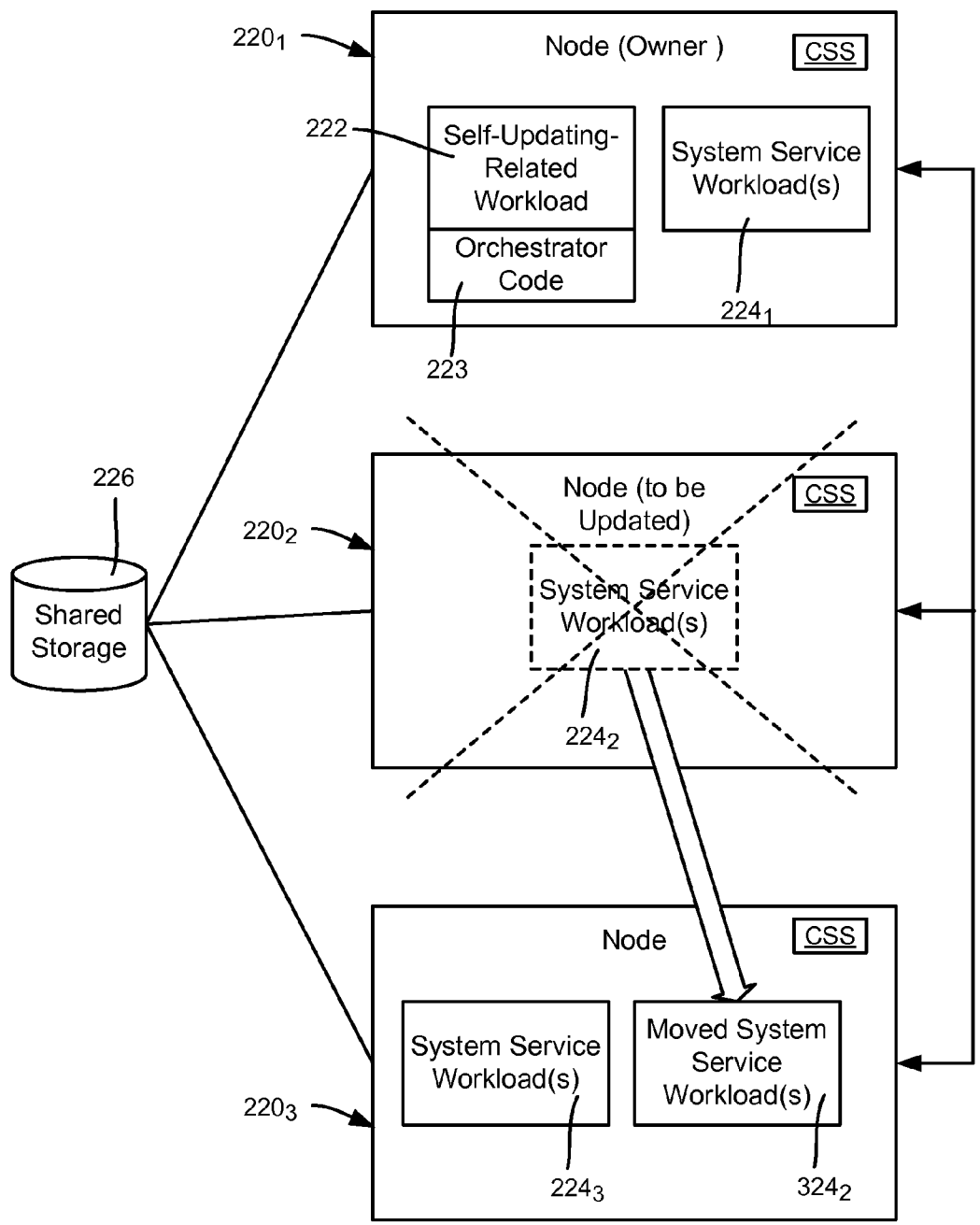

In general, as represented in FIG. 3, the orchestrator code 222 operates to move the workloads of a node being updated, which in this example is the node $220_2$. This is represented by the system service workloads $224_2$ being moved to the node $220_3$ as moved system service workloads $324_2$, (also represented by the dashed crossed-out "X" over the dashed node/workloads $224_2$). For example, in a failover cluster, this may happen automatically in a known manner by requesting that cluster system software CSS pause the node $220_2$. Note that it is feasible for the cluster system software CSS, based upon its own mechanisms, to move the workloads $224_2$ or some subset thereof to the node $220_1$, instead of or in addition to moving the workloads to the node $220_3$, however this is not shown in FIG. 3 for purposes of simplicity.

Once moved, the orchestrator code 222 then operates to update the node $220_2$, which for efficiency already may have downloaded some or all of the updates, and otherwise taken one or more steps to prepare for the updates. The node $220_2$, which is no longer running system service workloads, may be rebooted as many times as needed to get the node software (and possibly even firmware) into the desired update state.

As described above, a shared storage 226 (e.g., highly reliable and available) is accessible to the nodes, including for reading and writing state information related to self-updating. The orchestrator code may write information to the shared storage at any appropriate time to reflect the state of the updating run, so that, for example, the update state is known regardless of any failure of the orchestrator code 222, including because of a failure of the owner node $220_1$. For example, once the update to the node $220_2$ is complete, the state information is updated to indicate that the update is complete, whereby if another node has to take over the updating run, this state information is known.

Figure 4:
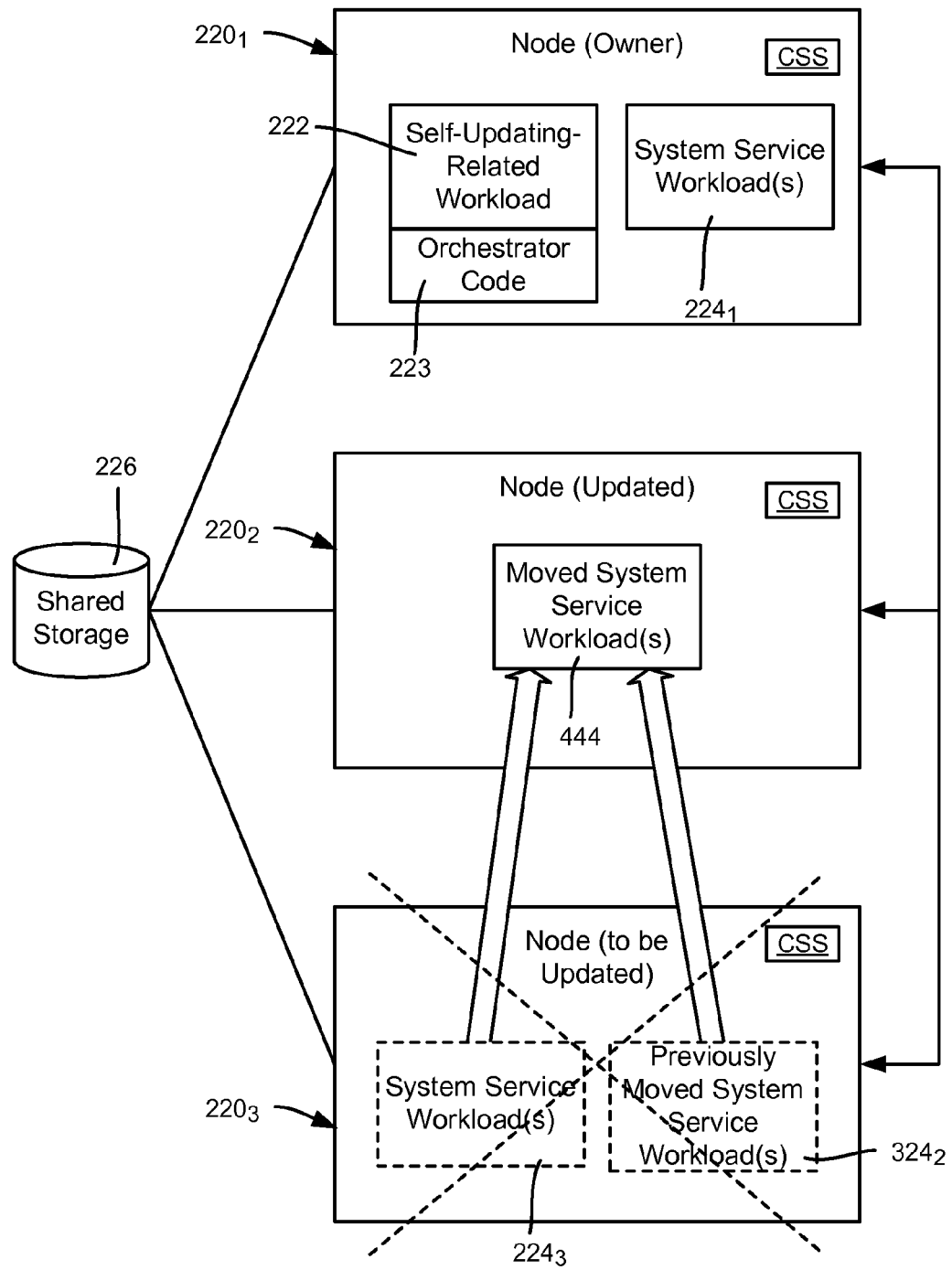

At this time, the node $220_2$ is updated and can resume running one or more workloads. In the example of FIG. 4, the workloads $224_3$ and $324_2$ from the node $220_3$ are moved to the node $220_2$ for this purpose. Again, it is feasible that some or all of the workloads of the node $220_3$ may be moved to the node $220_1$, however for simplicity in this example they are shown as being moved to the node $220_2$, and represented as moved system service workload(s) 444. Once moved, the node $220_3$ is ready for updating.

Once updated, including any reboot operations, the node $220_3$ can resume running one or more workloads. After the example of FIG. 4, only the owner node $220_1$ still needs to be updated. As described above, depending on the capabilities and configuration of the distributed system, the orchestrator code 223 may be able to move its workloads, update its own node software and automatically restart following a reboot, and thereby update the node without moving to another node. However, in the example of FIGS. 2-6, the orchestrator code 223 needs to move to another node to allow the node $220_1$ on which it is currently running to be updated.

One way the orchestrator code 223 may move to another node is by a request to the cluster system software CSS. Another way is to request that the node $220_1$ pause itself, if allowed by the cluster system software CSS; if so, the workloads are moved, and because the self-updating-related workload 222 is also a workload, the movement happens automatically using existing clustering technology.

Figure 5:
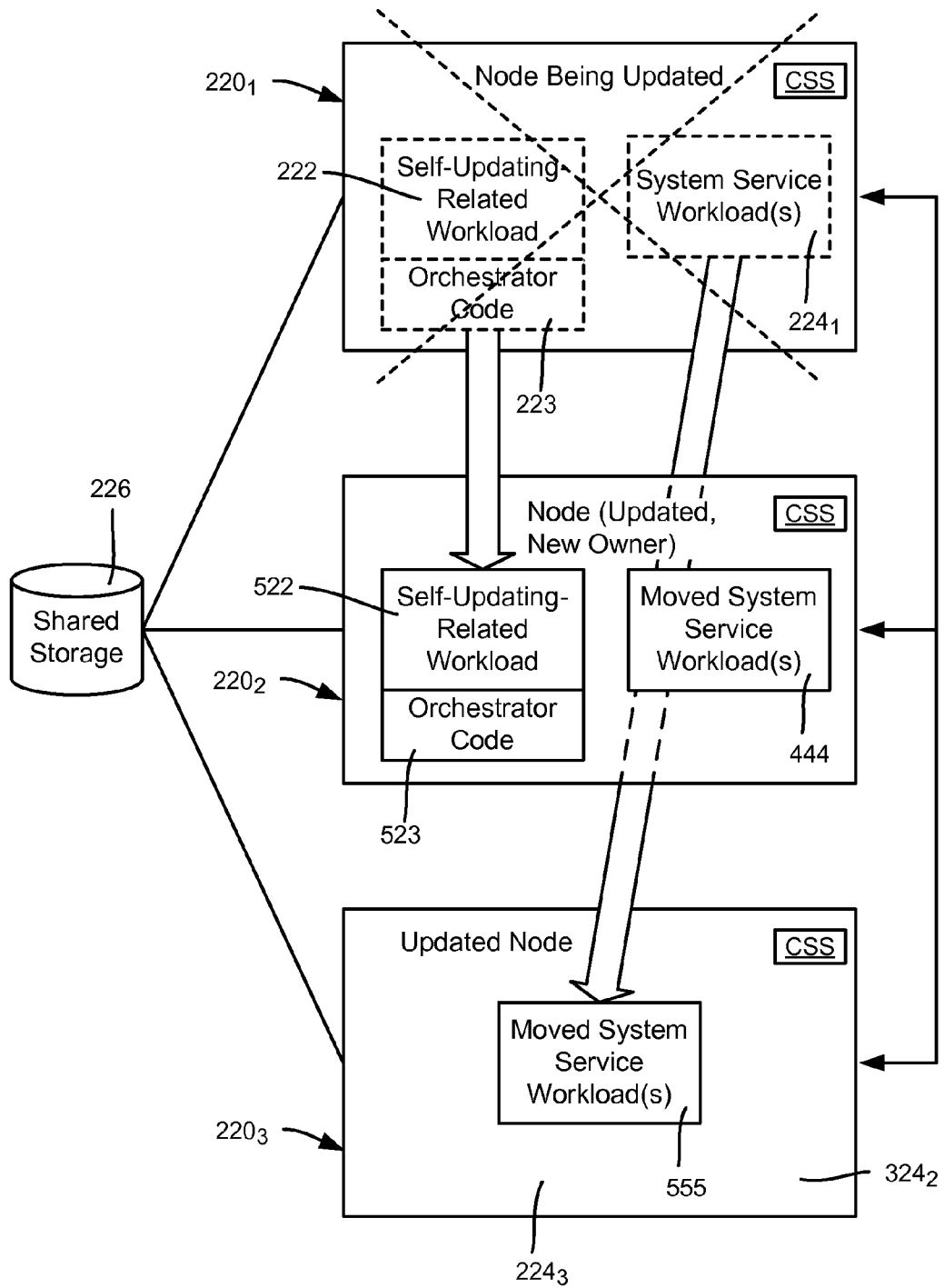

In the example of FIG. 5, to update the node $220_1$, the self-updating-related workload 222 (and if incorporated therein the orchestrator code 223) and the system service workloads $224_1$ of the node $220_1$ are moved to the other nodes $220_2$ and $220_3$ by launching instances thereof on those nodes as directed by the cluster system software CSS. Although it is understood that the cluster system software CSS may move the workloads to the other nodes $220_2$ and $220_3$ according to its own mechanisms, in the example of FIG. 5 the self-updating-related workload 222 is moved to the node $220_2$ as another instance of the self-updating-related workload 522, and the system service workload(s) $224_1$ moved to the node $220_3$ to become the system service workload(s) 555. If the orchestrator code 523 is not incorporated into the self-updating-related workload 522, then upon launching the self-updating-related workload 522 operates to launch the orchestrator code 523. At this time, the node $220_2$ becomes the new owner with respect to owning the self-updating-related workload 520/orchestrator code 523.

The orchestrator code 523, when launched, reads the shared storage 228 and determines from the persisted state information that the node $220_1$ needs updating. This may include moving any other workloads from the node $220_1$, (although as described above such other workloads already may have been moved in conjunction with moving the self-updating-related workload 222). The node $220_1$ is then updated, including any reboot operations as needed.

Figure 6:
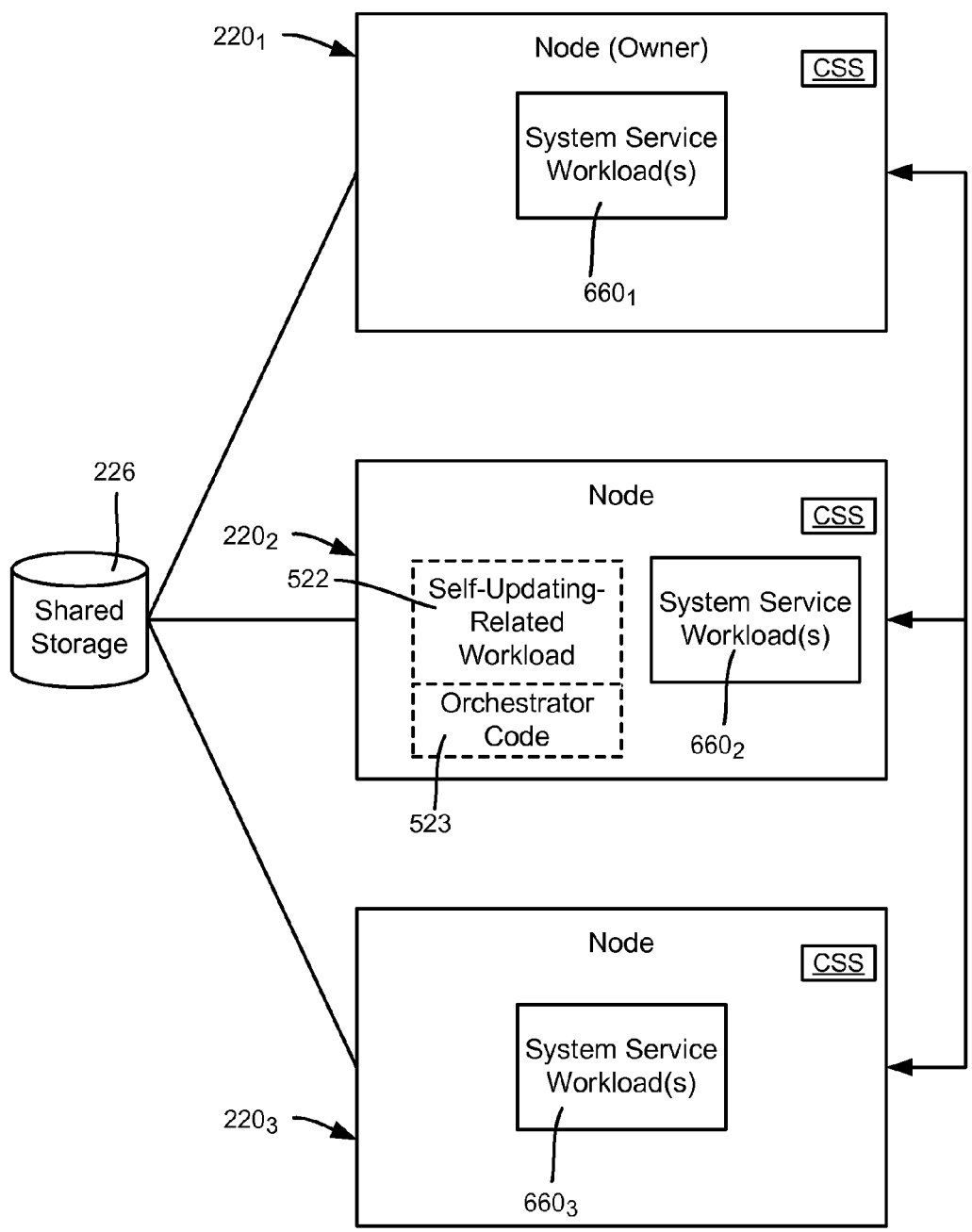

FIG. 6 shows the example distributed system of the nodes $220_1$-$220_3$ after the updating run is complete for the three nodes. Note that at this time, the self-updating related workload may write state information to the shared storage 226, (or clear the information) indicating that the updating run is complete. The self-updating related workload 522 (and/or orchestrator code 523) may then sleep and/or terminate in whole or in part until the next update event or schedule, shown as dashed boxes in FIG. 6). Further note that as represented by the system service workloads $660_1$-$660_3$, the cluster system software CSS may move the workloads around as desired, such as to balance the workloads. This may include reinstating at least one workload that was moved from an updated machine before or as part of updating back to that machine after updating.

Although not necessary, a user interface may be provided to allow a user to interact with the updating process, such as coupled to or part of a local proxy $120_1$-$120_N$ of FIG. 1A. Part of the interaction may be an initialization, (e.g., set up once for the system unless and until changed). For example, any options for the update-related software may be user configurable, e.g., relative to default values. A user may also view information as to the state of the update, e.g., as recorded in the shared storage or another accessible location, to monitor the progress. With an appropriate interface, a user may couple a non-member device to the distributed system to interact with the update to some extent.

For example, the self-updating mode may be temporarily suspended if desired by a user, such as from the user interface or a command line, e.g., a Windows® PowerShell cmdlet. When the user re-enables the self-updating-related workload, e.g., via similar interaction, the next updating run occurrence is determined by the schedule defined in the distributed workload options.

In one implementation, such as for checking a changed setting in the distributed system updating infrastructure or ensuring that an update does not have to wait for the schedule, an updating run may be started on-demand, even while the distributed system overall continues to be in the self-updating mode. A user interface or a command line option (e.g. an "UpdateNow" option) overrides the defined self-updating schedule for this one time, and initiates the updating run.

Figure 7:
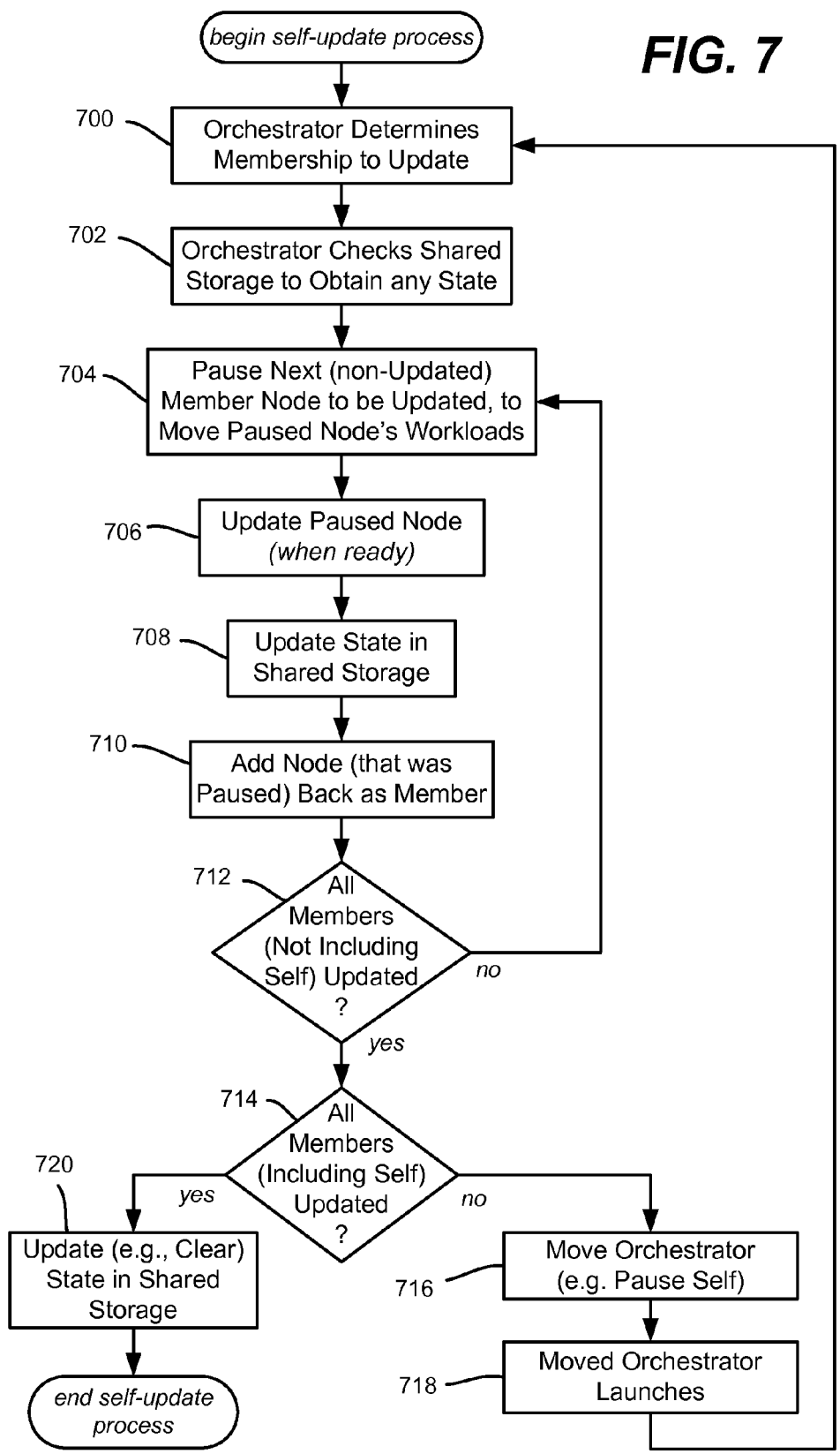
FIG. 7 is a flow diagram representing example steps that may be taken in an example self-updating distributed system at various states during a self-updating run.

FIG. 7 is a flow diagram summarizing example steps for an implementation in which an orchestrator process runs on a distributed system owner node, such as at a user-defined schedule, and begins the updating run with any user-defined run options. As will be seen in this example, when the owner node is to be updated, the orchestrator is moved to a different computer node, typically one that has already been updated in this updating run. As will also be seen in this example, the new (moved) orchestrator process continues the same updating run, and ensures that the updating run properly completes by updating any remaining system nodes that were not yet updated.

Step 700 is directed to the orchestrator determining the membership comprising those nodes to be updated. Ordinarily, a distributed system wants to have all of its nodes in a consistent state with respect to one another's updates, (except temporarily during the updating run), however alternative implementations may allow for updates to different member sets. Step 700 also represents the orchestrator or other update-related software making sure (e.g., via the cluster system software) that the updates are able to be applied in a way that maintains the availability of the services offered by the distributed system. For example, if only one node is currently operating, the updating run cannot be allowed to pause or shut down that one node. Further, if the workloads are not able to be adequately handled by another node or nodes if moved thereto, such as if the distributed system is heavily loaded at that time, the updating may be deferred to a less busy time. Thus, updating may need to wait until enough nodes/resources are available to allow the update without disturbing the offered system services.

Step 702 represents the orchestrator checking the shared storage to obtain any existing state for this updating run. Note that in this example, the orchestrator when launched does not know if it is starting a new run or completing another run, and thus accesses the state information (although it is feasible for a parameter or the like to be used to distinguish a new updating run).

Step 704 represents pausing the next node to be updated. This is determinable from the state information, e.g., as nodes have system-unique identities, and which one or ones (if any) that have been updated is data that is recorded in the state information. As described above, the pause request (e.g., made to the cluster system software) moves the paused node's workloads to one or more other nodes.

Step 706 updates the paused node when ready, e.g., after its workloads are moved. Note that it is feasible for some of the update processing to begin while the workloads are being moved, depending on the code being updated, for example.

Step 708 represents updating the state information in shared storage to reflect the update of the node that was updated at step 706. Updating typically includes rebooting one or more times, as described above. Note that the state information may be updated at other times, (not shown in FIG. 7), such as to occasionally provide some status/progress data or to prepare in case of failure, however a significant time is when a node update is complete, as another node may resume the updating run at this time.

Step 710 adds the node that was paused back as a member of the distributed system. This may be done by a request to the cluster system software, and allows the now-updated node to begin handling distributed system service workloads as directed by the cluster system software. One of the workloads may be the self-updating-related workload, such as in the case of a two-node system.

Step 712 evaluates whether all other member nodes that are to be updated, not including the node running the orchestrator, have been updated. If not, step 712 branches back to step 704 to continue the updating run.

Once all other nodes to be updated have been updated, step 712 branches to step 714. Step 714 evaluates whether the updating run is complete, that is, all member nodes including the node running the orchestrator, have been updated. If not, step 716 represents moving the orchestrator, which may be by moving the self-updating-related workload which it contains the orchestrator, or by moving the self-updating-related workload when it launches the orchestrator. In any event, the orchestrator is moved to a new node and launches at step 718.

Step 718 returns to step 702 to repeat the process. In a typical scenario in which there was no failure, at step 704 the only non-updated node is the one that originally ran the orchestrator, however it is feasible that because of failure there may be one or more nodes to update. In any event, the process repeats until all the nodes that are members or remain as members are updated.

At some point, at step 714 the node that is running the orchestrator has completed the updating run on all other nodes as evaluated at step 712, and itself has been updated as evaluated at step 714. At this point, the updating run is complete, and the state information in the shared storage is updated to reflect the update completion at step 720. Depending on the implementation, the state information may be cleared, for example, so that the next updating run realizes that an entire new updating run is to be performed, although other information, such as the version data to which the nodes have been updated may be maintained.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 8:
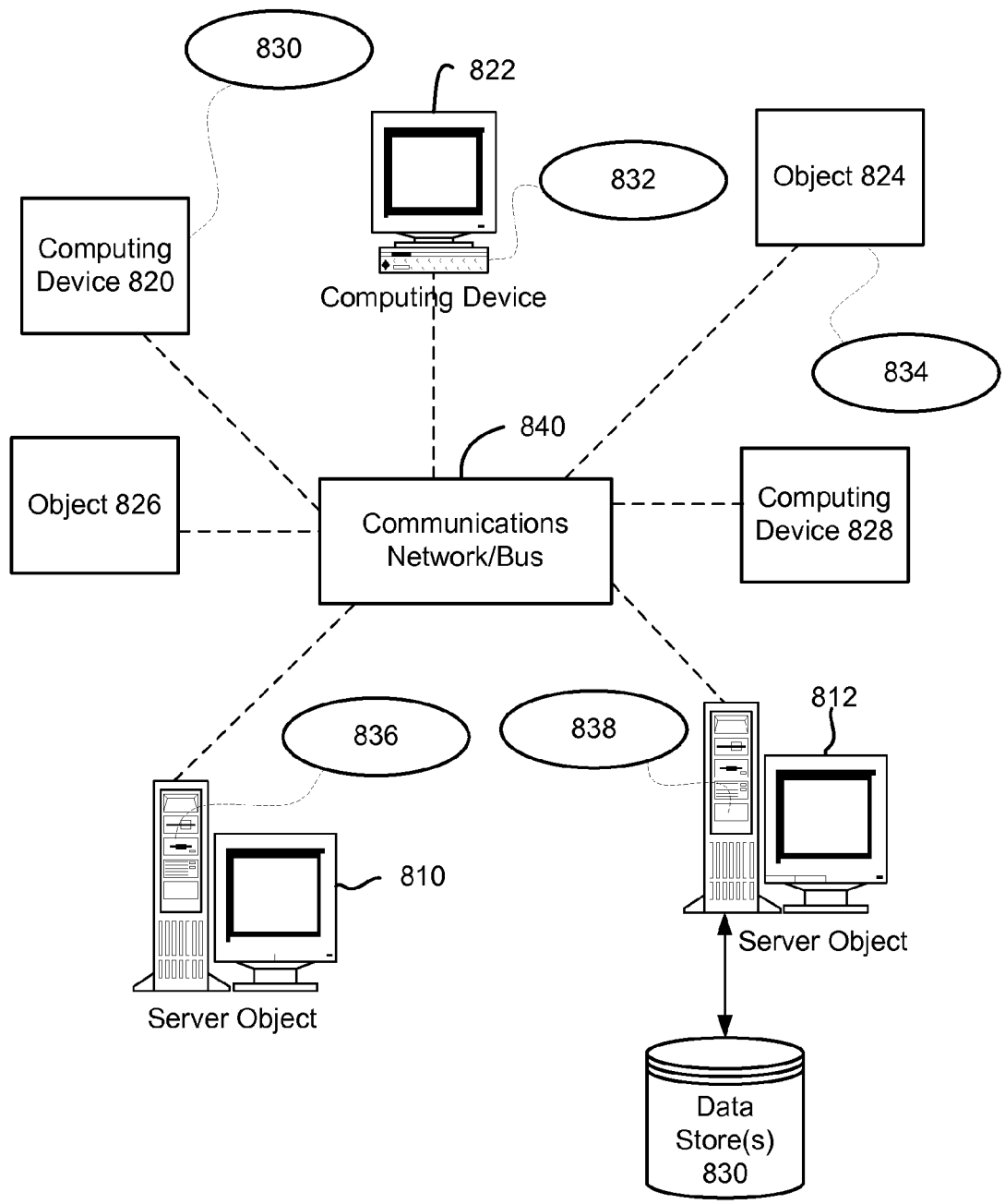
FIG. 8 is a block diagram representing example non-limiting networked environments in which various embodiments described herein can be implemented.

FIG. 8 provides a schematic diagram of an example networked or distributed computing environment. The distributed computing environment comprises computing objects 810, 812, etc., and computing objects or devices 820, 822, 824, 826, 828, etc., which may include programs, methods, data stores, programmable logic, etc. as represented by example applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing object or device 820, 822, 824, 826, 828, etc. can also contain an application, such as applications 830, 832, 834, 836, 838, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc., acting as servers provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 840 or bus is the Internet, for example, the computing objects 810, 812, etc. can be Web servers with which other computing objects or devices 820, 822, 824, 826, 828, etc. communicate via any of a number of known protocols, such as the hypertext transfer protocol (HTTP). Computing objects 810, 812, etc. acting as servers may also serve as clients, e.g., computing objects or devices 820, 822, 824, 826, 828, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 9 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
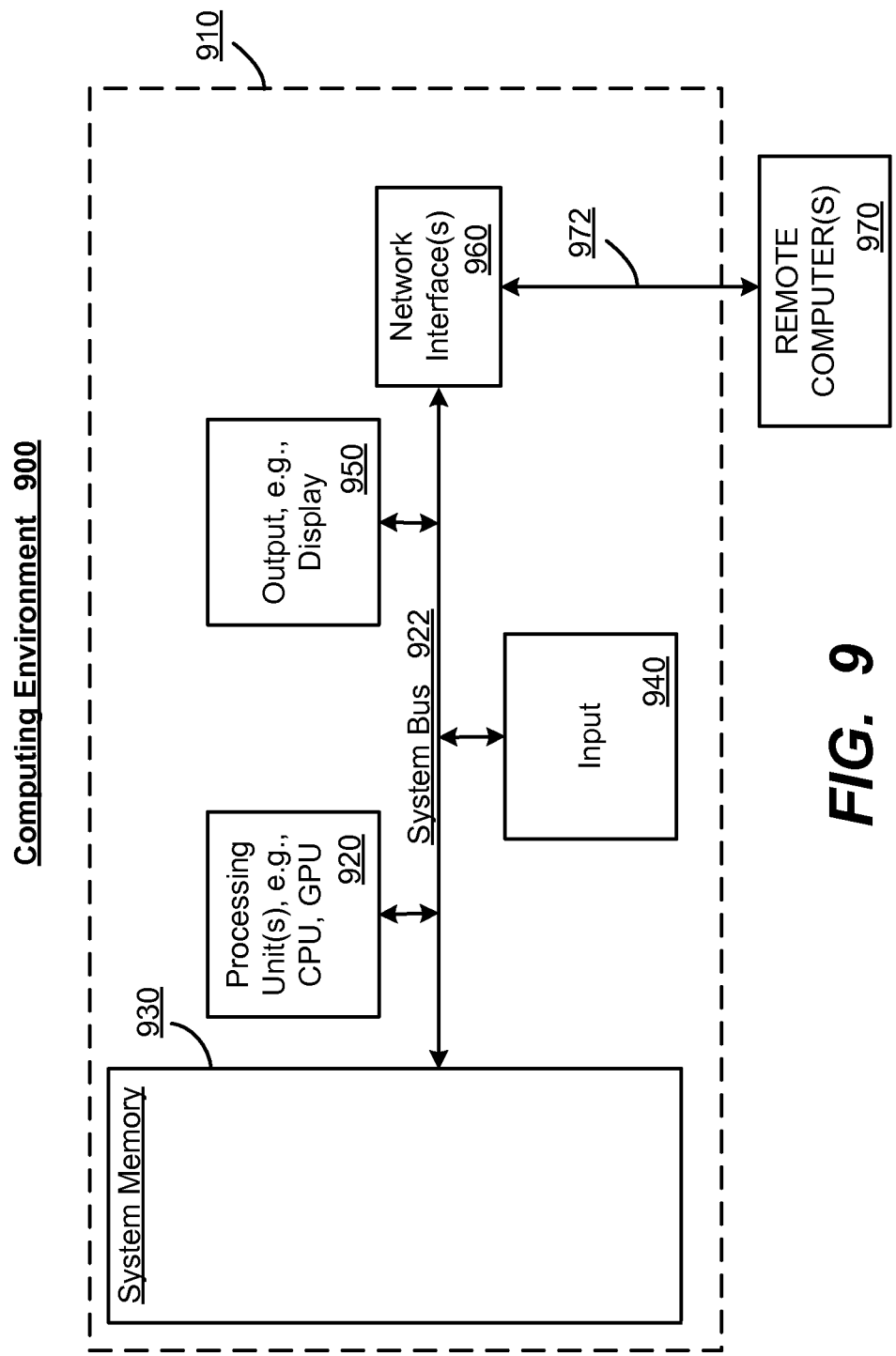
FIG. 9 is a block diagram representing an example non-limiting computing system or operating environment in which one or more aspects of various embodiments described herein can be implemented.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. In addition, the computing system environment 900 is not intended to be interpreted as having any dependency relating to any one or combination of components illustrated in the example computing system environment 900.

With reference to FIG. 9, an example remote device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 960 and interface 972, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor comprising:

determining, by an orchestrator module of a distributed system, node membership of a plurality of computer nodes of the distributed system that provides services; and performing a self-updating run of the distributed system, including applying one or more updates to a node-local software inventory of the plurality of computer nodes in the membership while maintaining the services provided by the distributed system, including for a computer node of the plurality of computer nodes to be updated, obtaining at least a portion of the one or more updates before moving any service workloads from that computer node to another computer node, moving the service workloads from that computer node to the other computer node, installing the one or more updates, and reinstating at least one service workload on that computer node after the update is completed for that computer node.

2. The method of claim 1, wherein performing the self-updating run includes rebooting or restarting, or both rebooting and restarting, at least one time, the plurality of computer nodes in the membership.

3. The method of claim 1 wherein moving the service workloads includes pausing that computer node.

4. The method of claim 1 further comprising:
determining an operating status of the plurality of computer nodes of the distributed system, including the service workloads; and
in response to a determination that the services provided by the distributed system cannot be maintained with the service workloads being moved, deferring the self-updating run to another time.

5. The method of claim 1 wherein performing the self-updating run includes moving the orchestrator module from one computer node that is about to be updated to another computer node of the plurality of computer nodes.

6. The method of claim 1 wherein performing the self-updating run includes resuming one or more service workloads on an updated computer node before completion of the self-updating run.

7. The method of claim 1 wherein the orchestrator module is associated with a self-updating-related workload, and wherein performing the self-updating run includes moving the self-updating-related workload from one computer node to another computer node of the plurality of computer nodes.

8. The method of claim 1 wherein the distributed system comprises a failover cluster, wherein the orchestrator module is associated with a self-updating-related workload, and wherein performing the self-updating run includes failing over the self-updating-related workload from one computer node to another computer node of the plurality of computer nodes.

9. The method of claim 1 further comprising:
persisting update-related state information to a shared storage of the plurality of computer nodes;
moving the orchestrator module from one computer node to another computer node in the plurality of computer nodes during the self-updating run; and
reading the update-related state information at the other node after moving the orchestrator module from the one computer node to the other computer node.

10. A system comprising:
a plurality of computer nodes arranged as a distributed system;
a processor on a first computer node of the plurality of computer nodes within the distributed system, the processor executing a self-updating orchestrator module configured to:
run on the first computer node of the plurality of computer nodes to update other computer nodes of the plurality of computer nodes with node-local software updates in an updating run;
coordinate the node-local software updates so as to maintain the services provided by the distributed system during the updating run, including during any rebooting or restarting, or both, of any node of the distributed system; and
move to a second node of the plurality of computer nodes to update the first computer node with node-local software updates in the updating run so as to maintain the services provided by the distributed system during the updating run.

11. The system of claim 10 wherein the distributed system includes a shared storage or a distributed storage service, and wherein the self-updating orchestrator module comprises a software workload configured to write update run state information to the shared storage or the distributed storage service during the updating run as the self-updating orchestrator module moves across two or more of the plurality of computer nodes.

12. The system of claim 10 wherein the self-updating orchestrator module comprises a mechanism implemented at least in part on hardware or firmware permanently coupled to the plurality of computer nodes, wherein the mechanism comprises an instance of the self-updating orchestrator module, and wherein the self-updating orchestrator module moves to the second node of the plurality of computer nodes by running the instance of the self-updating orchestrator module implemented on the second node.

13. The system of claim 10 wherein the distributed system is incorporated into an appliance-type device.

14. The system of claim 10 wherein the distributed system comprises a failover cluster.

15. One or more computer storage devices having computer-executable instructions, which in response to execution by a computer, cause the computer to perform steps, comprising:
running, by a self-updating orchestrator module, a self-updating run on a distributed system comprising a plurality of computer nodes, including:
initializing the self-updating run on a first computer node of the plurality of computer nodes;
updating other computer nodes of the plurality of computer nodes with a set of one or more node-local software updates;
moving workloads from the first computer node to a second computer node that has been updated during the self-updating run;
instantiating the self-updating run on the second computer node; and
updating the first computer node with the set of one or more node-local software updates.

16. The one or more computer storage devices of claim 15 wherein updating the other computer nodes comprises rebooting or restarting the other computer nodes at least once.

17. The one or more computer storage devices of claim 15 wherein the self-updating orchestrator module comprises a self-updating workload, and wherein moving the workloads from the first computer node to the second computer node includes moving the self-updating workload.

18. The one or more computer storage devices of claim 15 wherein moving the workloads comprises pausing the first computer node.

19. The one or more computer storage devices of claim 15 having further computer-executable instructions comprising:
   writing state information indicative of a state of the self-updating run to a shared storage or a distributed storage service.

20. The system of claim 10 wherein the self-updating orchestrator module comprises a mechanism implemented at least in part by a thread running on the first computer node.

* * * * *